(12) United States Patent
Xiao (10) Patent No.: US 9,585,440 B2
(45) Date of Patent: Mar. 7, 2017

(54) BUCKLE DEVICE (71) Applicant: WONDERLAND NURSERYGOODS COMPANY LIMITED, Hong Kong (HK)

(72) Inventor: Xiao-Hong Xiao, Hong Kong (HK)

(73) Assignee: WONDERLAND NURSERYGOODS COMPANY LIMITED, Hong Kong (HK)

( * ) Notice: Subject to any disclaimer, the term of this patent is extended or adjusted under 35 U.S.C. 154(b) by 0 days.

(21) Appl. No.: 14/668,252

(22) Filed: Mar. 25, 2015

(65) Prior Publication Data
US 2015/0272281 A1    Oct. 1, 2015

(30) Foreign Application Priority Data

Mar. 28, 2014 (CN) .................... 2014 2 0147637 U (51) Int. Cl.
*A44B 11/16* (2006.01)
*A44B 11/00* (2006.01)
*B60R 22/18* (2006.01)

(52) U.S. Cl.
CPC ............ *A44B 11/16* (2013.01); *A44B 11/006* (2013.01); *B60R 2022/1806* (2013.01); *Y10T 24/4077* (2015.01)

(58) Field of Classification Search
CPC .................. A44B 11/16; A44B 11/006; B60R 2022/1806; Y10T 24/2077
USPC .................................... 24/171, 523; 297/464
See application file for complete search history.

(56) References Cited

U.S. PATENT DOCUMENTS

| 1,611,588 | A | * | 12/1926 | Hyde | ...................... | A44B 11/10 |
| | | | | | | 24/171 |
| 2,728,966 | A | * | 1/1956 | Cantil | .................. | A44B 11/006 |
| | | | | | | 24/196 |
| 2,938,254 | A | * | 5/1960 | Gaylord | ................. | A44B 11/16 |
| | | | | | | 24/171 |
| 3,414,947 | A | * | 12/1968 | Holmberg | .......... | A44B 11/2557 |
| | | | | | | 24/196 |
| 3,600,769 | A | * | 8/1971 | Bachmann | .......... | A44B 11/2511 |
| | | | | | | 24/650 |
| 3,928,895 | A | * | 12/1975 | Klink | ..................... | A44B 11/10 |
| | | | | | | 24/196 |

FOREIGN PATENT DOCUMENTS

CA           2534716 A1 *  8/2006   ........... A44B 11/006

* cited by examiner

*Primary Examiner* — Milton Nelson, Jr.
(74) *Attorney, Agent, or Firm* — Hamre, Schumann, Mueller & Larson, P.C.

(57) ABSTRACT

A buckle device includes a securing member, a frame, and at least one resilient member. The securing member is adapted to be fixedly mounted on a base. The frame includes a pivoting portion pivotally connected to the securing member to enable the frame to rotate relative to the securing member, a pair of side arms respectively connected to two opposite ends of the pivoting portion, and a forearm disposed oppositely to the pivoting portion and having opposite ends that are respectively connected to the side arms. The resilient member has a secured end portion that is secured at the securing member, and an abutting end portion in abutment with the frame for biasing the frame to rotate toward the base.

18 Claims, 10 Drawing Sheets

BUCKLE DEVICE

CROSS-REFERENCE TO RELATED APPLICATION

This application claims priority of Chinese Utility Model Application No. 201420147637.5, filed on Mar. 28, 2014.

FIELD

The disclosure relates to a buckle device, and more particularly to a buckle device for retaining a fastening belt.

BACKGROUND

Belts (such as safety belts) are usually included in seating devices, such as car seats or safety seats, to assure passenger safety. In such case, buckle devices may be used for fastening or retaining the belts.

Figure 1:
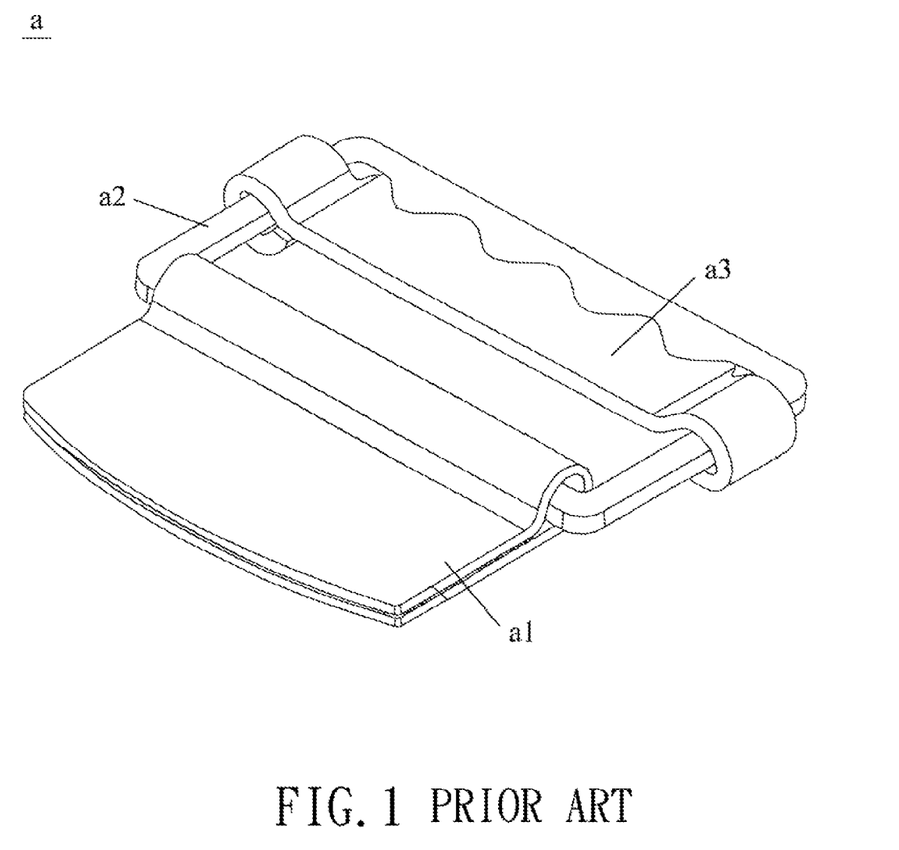
FIG. 1 is a perspective view of a conventional buckle device.

Referring to FIG. 1, a conventional buckle device (a) for fastening a belt includes a securing member (a1), a frame (a2) and a slide member (a3). The securing member (a1) is fixedly mounted to a base of a seat. The frame (a2) has a pivoting arm that is pivotally connected to the securing member (a1) to enable the frame (a2) to rotate relative to the securing member (a1), a pair of side arms that are connected to the pivoting arm, and a forearm that is connected to the side arms. The slide member (a3) is connected slidably to the side arms between the forearm and the pivoting arm. When in use, a belt may be extended through a space between the slide member (a3) and the pivoting arm from one side of the frame (a2) (e.g., a bottom side), through a space between the slide member (a3) and the forearm from another side of the frame (a2)(e.g., a top side) to surround the slide member (a3), and then away from the frame (a2). When a force is applied to the belt along its longitudinal direction, the slide member (a3) may be driven by the belt to move toward the forearm, thereby enabling the forearm and the slide member (a3) to cooperatively clamp the belt. However, when the force applied to the belt is not along the longitudinal direction thereof, the frame (a2) may be easily rotated, such that the slide member (a3) may slide relative to the frame (a2) to release the belt under inappropriate circumstances and result in safety issues.

SUMMARY

Therefore, one object of the disclosure is to provide a buckle device that may alleviate the drawback of the prior art.

According to one aspect of the disclosure, a buckle device includes a securing member, a frame and at least one resilient member. The securing member is adapted to be fixedly mounted on a base. The frame includes a pivoting portion that is pivotally connected to the securing member to enable the frame to rotate relative to the securing member, a pair or side arms that are respectively connected to two opposite ends of the pivoting portion, and a forearm that is disposed oppositely to the pivoting portion and has opposite ends respectively connected to the side arms. The resilient member has a secured end portion that is secured at the securing member, and an abutting end portion that is in abutment with the frame for biasing the frame to rotate toward the base.

According to another aspect of the disclosure, a buckle device includes a securing member, a frame, a slide member, a belt and at least one resilient member. The securing member is adapted to be fixedly mounted on a base. The frame includes a pivoting portion that is pivotally connected to the securing member to enable the frame to rotate relative to the securing member, a pair of side arms that are respectively connected to two opposite ends of the pivoting portion, and a forearm that has opposite ends respectively connected to the side arms oppositely of the pivoting portion. The slide member has two opposite ends slidably and respectively connected to the side arms between the pivoting portion and the forearm. The belt extends through a space between the slide member and the forearm and is clamped by the slide member and the forearm. The resilient member has a secured end portion that is secured at the securing member, and an abutting end portion in abutment with the frame for biasing the frame to rotate toward the base and to restrain the belt.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that like elements are denoted by the same reference numerals throughout the disclosure.

Figure 2:
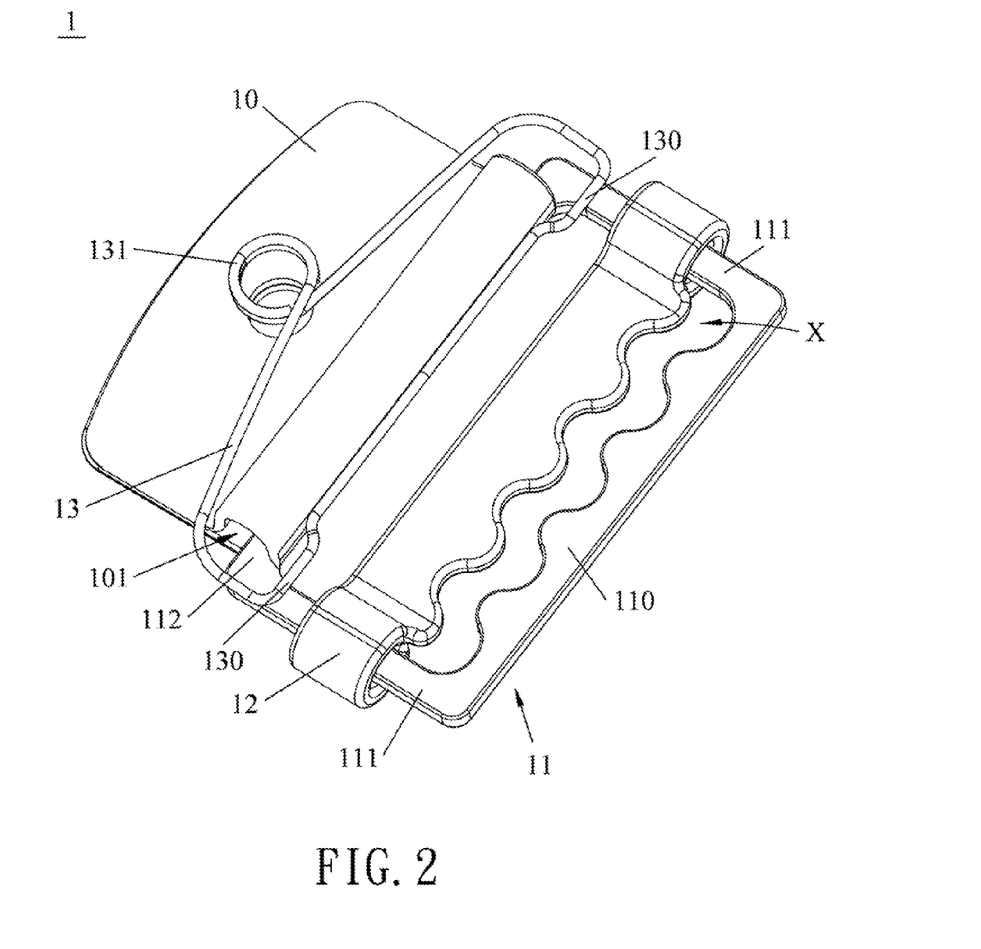
FIG. 2 is a perspective view illustrating a first exemplary embodiment of a buckle device according to the present disclosure.

Referring to FIG. 2, the first exemplary embodiment of a buckle device 1 according to the present disclosure is adapted to be installed on a seating device, for instance, a car seat, a children safety seat or the like, to retain a fastening belt (such as a seat belt, a securing belt or a fastening belt). In some embodiments, the belt may be part of the buckle device 1.

The buckle device 1 of this embodiment includes a securing member 10, a frame 11 and a slide member 12. The securing member 10 is adapted to be fixedly mounted on a base (not shown) of the seating device. As shown in FIG. 2, the frame 11 includes a pivoting portion 112, a pair of side arras 111 that are respectively connected to two opposite ends of the pivoting portion 112, and a forearm 110 having opposite ends respectively connected to the side arms 111 oppositely of the pivoting portion 112. The pivoting portion 112 is pivotally connected to the securing member 10 to enable the frame 11 to rotate relative to the securing member 10, so that the forearm 110 may be away from or close to the base due to the rotation of the frame 11. The slide member 12 has two opposite ends slidably and respectively connected to the side arms 111 between the pivoting portion 112 and the forearm 110, so that the belt may be extended through a space (X) between the slide member 12 and the forearm 110, and clamped cooperatively by the slide member 12 and the forearm 110. In this embodiment, the buckle device 1 further includes a resilient member 13 having a secured end portion that is secured at the securing member 10, and an abutting end portion that is in abutment with the frame 11 for biasing the frame 11 to rotate toward the base and to press the belt toward the base. In this embodiment, the abutting end portion of the resilient member 13 provides a resilient force toward both of the side arms 111, so as to bias the frame 11 together with the slide member 12 to rotate toward the base and to allow the same to be pressed toward the base.

Figure 3:
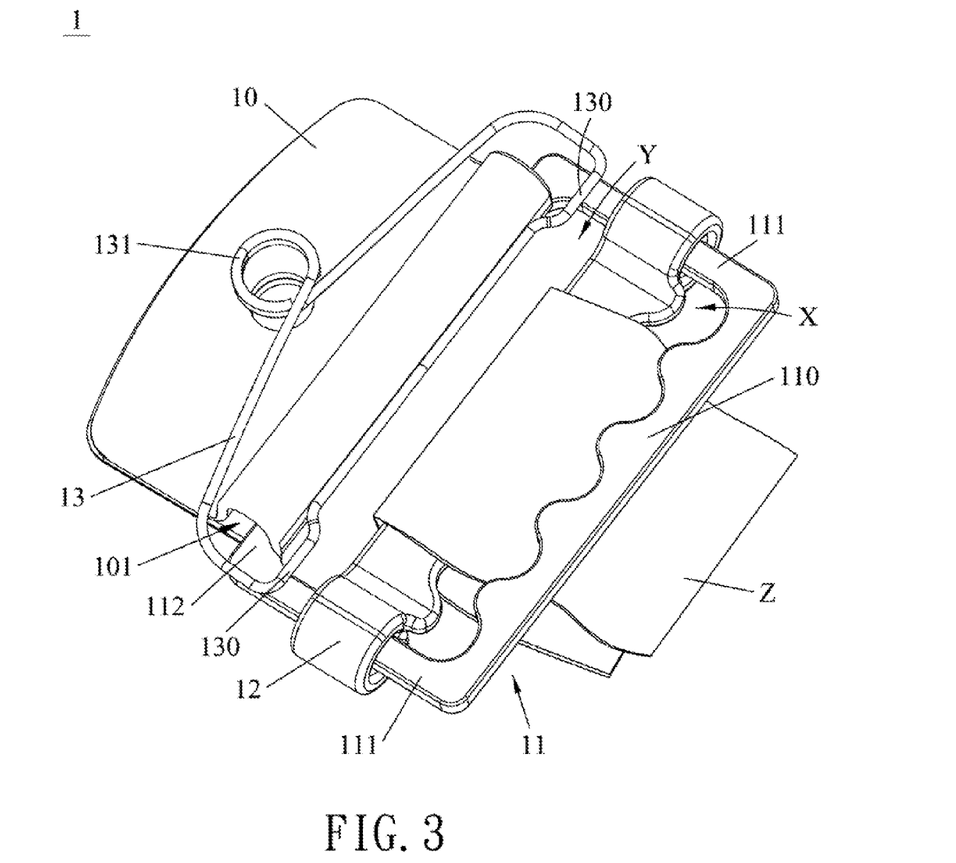
FIG. 3 is another perspective view of the first exemplary embodiment, illustrating a belt retained by the buckle device.

As shown in FIG. 3, a method to use the buckle device 1 of this embodiment is described herein below. One end of a belt (Z) is extended through a space (Y) between the pivoting portion 112 and the slide member 12 from a bottom side of the frame 11, through the space (X) between the slide member 12 and the forearm 110 from a top side of the frame 11 to surround the slide member 12, and then away from the frame 11. The end of the belt (Z) may be pulled to be away from the frame 11, such that the slide member 12 may be forced by the belt (Z) to slide toward the forearm 110 due to the pulling of the belt (Z), thereby allowing the slide member 12 and the forearm 110 to clamp the belt (Z) therebetween. In addition, since the frame 110, as well as the slide member 12, is biased by the abutting end portion of the resilient member 13 to be pressed toward the base, thereby pressing the belt (Z) against the base. Once the resilient force of the resilient member 13 is offset, the forearm 11 can then be rotated away from the base and no longer press the belt (2). As such, the belt (Z) can be released from the buckle device 1.

In this embodiment, the securing member 10 is configured as a plate shape at one end thereof and is formed with a sleeve 101 at another end thereof to rotatably receive the pivoting portion 112 of the frame 11 therein. Here, the securing member 10 may be formed from a plate that is bent and folded back in half to form the sleeve 101. Moreover, the sleeve 101 extends in a direction parallel to the forearm 110, and the pivoting portion 112 is arranged parallel to the forearm 110. In this embodiment, the frame 11 is configured in a rectangular-like shape, where the pivoting portion 112, the side arms 111 and the forearm 110 are coplanar. As shown in FIG. 3, the forearm 110 and the slide member 12 may respectively have toothed edges that are opposite to each other and that have matching configuration, so as to further enhance the clamping of the belt (Z). It should be noted that, in this embodiment, the pivoting portion 112 includes a single pivoting arm with two opposite ends respectively connected to the side arms 111, but in other embodiments the pivoting portion 112 may include a pair of spaced-apart pivoting arms to which the side arms 111 are respectively connected (i.e., the number of the pivoting arm is not limited to the disclosure of this embodiment).

The resilient member 13 may be made of any type of resilient material, such as plastics, rubbers or metal wires. In this embodiment, the resilient member 13 is a bent steel wire connected to the securing member 10 and the frame 11. To be specific, the resilient member 13 is formed as a closed loop structure, where the secured end portion is configured as a winding coil 131 fixed to the securing member 10, for instance, through a fastener (such as rivet) or through the securing member 10 being bent and folded back to clamp the winding coil 131. The abutting end portion is configured as a metal wire segment having two opposite ends connected to the winding coil 131 and including two abutting parts 130 respectively abutting against the side arms 111, providing stable and balanced pressure toward the frame 11.

Figure 4:
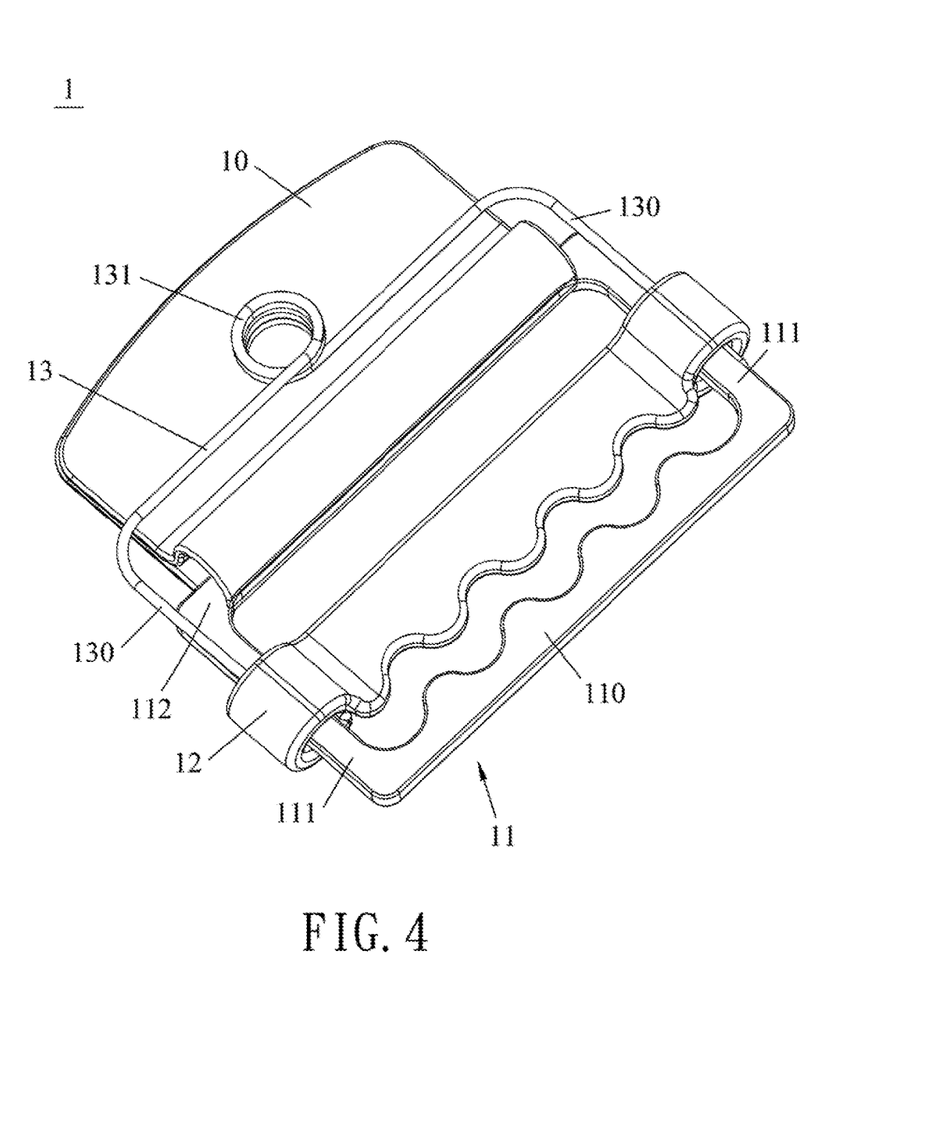
FIG. 4 is a perspective view illustrating a second exemplary embodiment of the buckle device according to the present disclosure.

Referring to FIG. 4, the second exemplary embodiment of the buckle device 1 according to the present disclosure is similar to the first exemplary embodiment, with the difference therebetween residing in the configuration of the resilient member 13. To be specific, in this embodiment, the resilient member 13 is not a closed loop structure and the abutting end portion of the resilient member 13 extends along both of the side arms 111 in a bifurcated manner. That is to say, the abutting parts 130 are configured as abutting arms extending respectively and free-endedly along and abutting respectively against the side arms 111 from the two opposite ends of the single pivoting arm of the pivoting portion 112. It should be noted that, in this embodiment, length of the abutting parts 130 may vary to enable adjustment of the resilient force exerted onto the side arms 111. In this embodiment, for example, an end of each of the abutting parts 130 may extend to be close to the forearm 110 for providing a relatively large force to the side arms 111.

Figure 5:
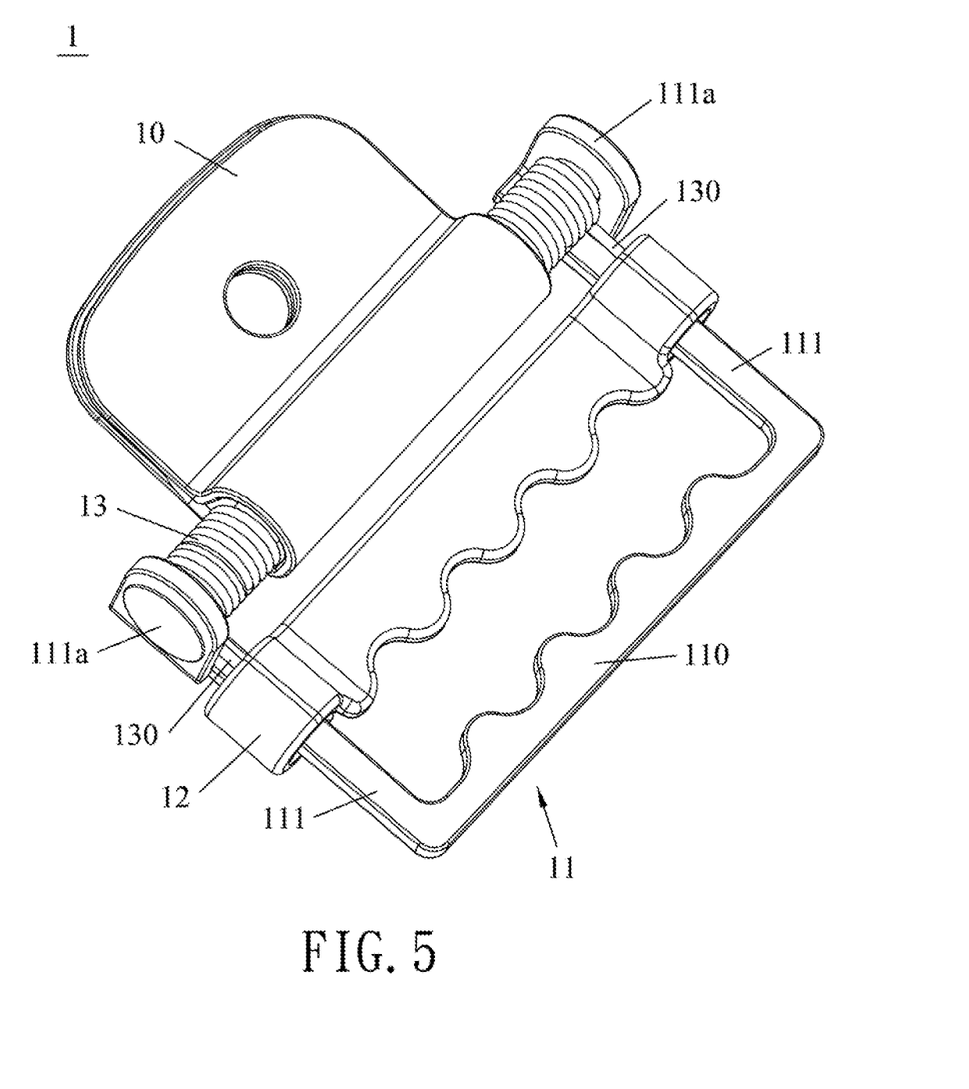
FIG. 5 is a perspective view illustrating a third exemplary embodiment of the buckle device according to the present disclosure.
Figure 6:
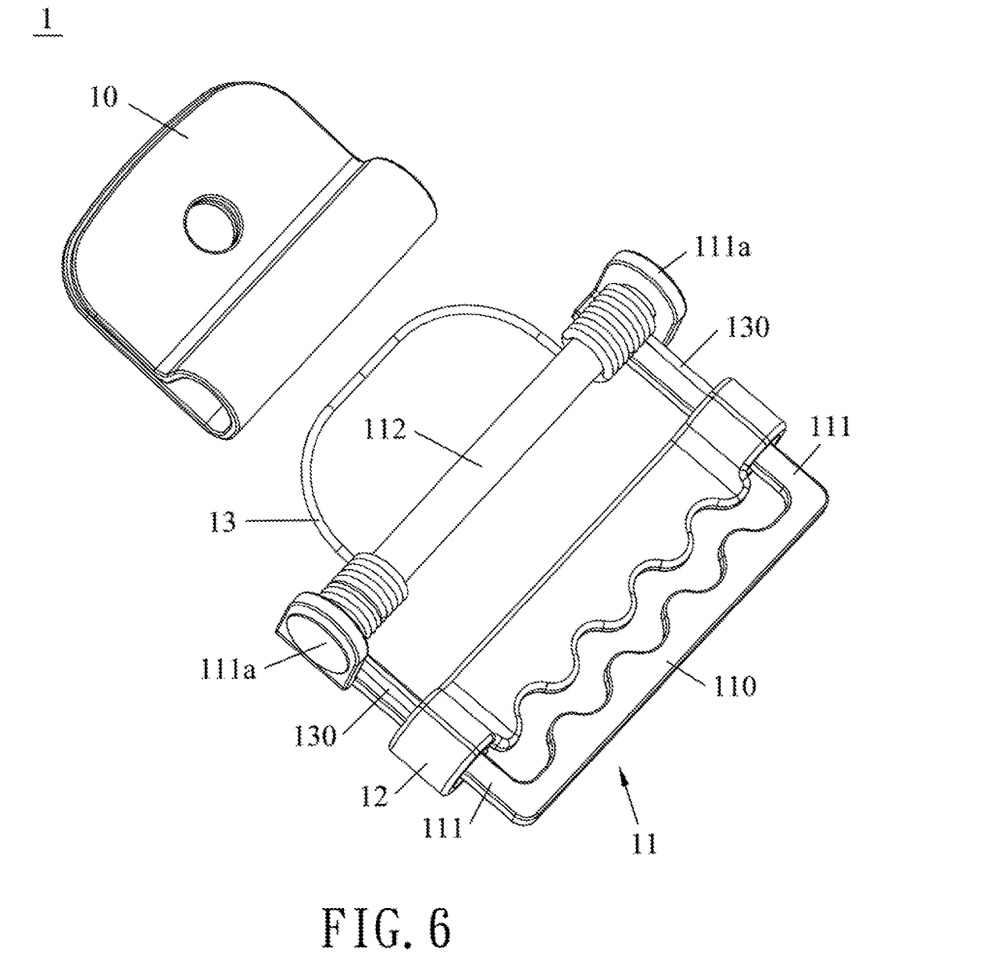
FIG. 6 is a partly exploded perspective view of the third exemplary embodiment.

Referring to FIGS. 5 and 6, the third exemplary embodiment of the buckle device 1 is similar to the second exemplary embodiment, with the difference therebetween described as follows. In this embodiment, the frame 11 further includes a pair of opposite plates 111a at the opposite ends of the pivoting portion 112. In addition, the secured end portion of the resilient member 13 is configured as a metal wire segment that is clamped by the securing member 10, and the abutting end portion of the resilient member 13 is partly wound around the pi voting port ion 112 and partly extends from the pivoting portion 112 to the side arms 111 to abut against the side arms 111. To be specific, the abutting end portion has a pair of winding segments respectively wound on the opposite ends of the pivoting portion 112 of the frame 11, and a pair of abutting parts 130 connected respectively to the winding segments and extending free-endedly along the side arms 111, respectively.

Figure 7:
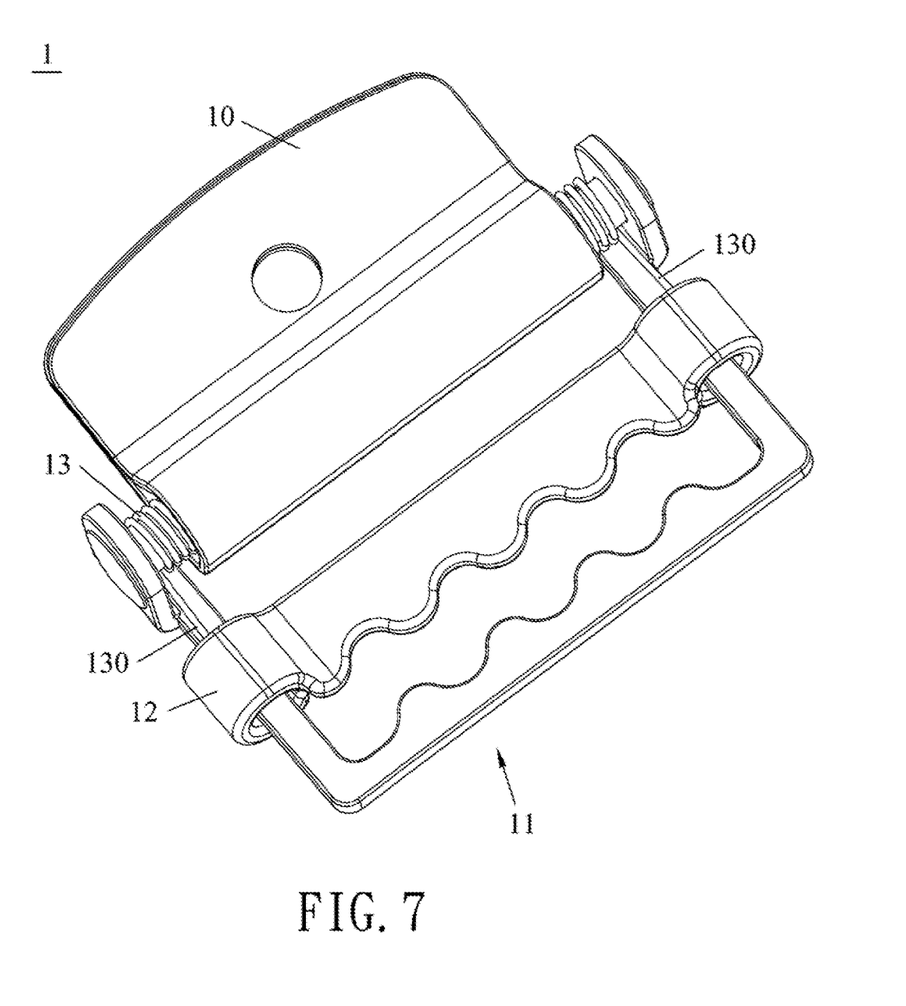
FIG. 7 is a perspective view illustrating a fourth exemplary embodiment of the buckle device according to the present disclosure.
Figure 8:
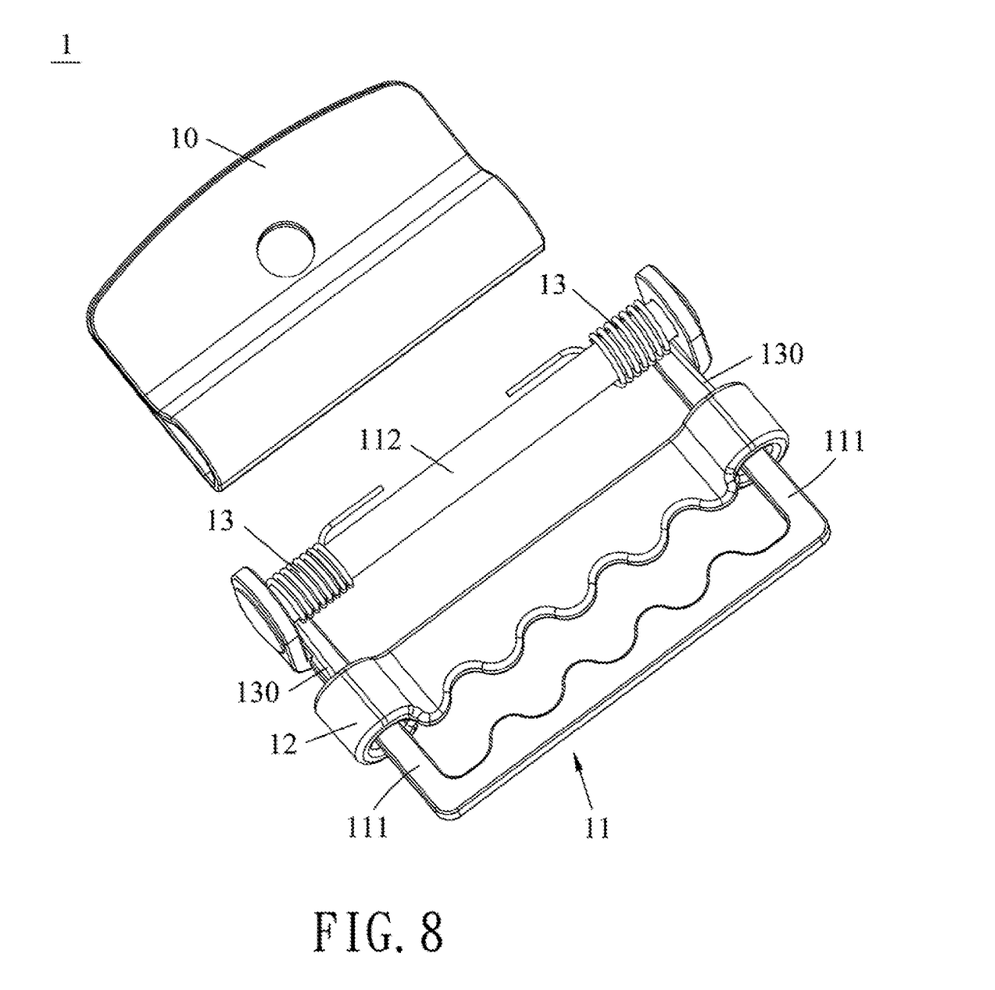
FIG. 8 is partly exploded perspective view of the fourth exemplary embodiment.

Referring to FIGS. 7 and 8, the fourth exemplary embodiment of the buckle device 1 according to the present disclosure is shown to be similar to the third exemplary embodiment, with the difference therebetween residing in that, in this embodiment, two resilient members 13 are included to be disposed at the two opposite ends of the pivoting portion 112. To be specific, for each resilient member 13, the secured end portion is clampingly engaged by the securing member 10, and the abutting end portion is wound around the pivoting portion 112 with an abutting part 130 extending from the pivoting portion 112 to a respective one of the side arms 111 to abut against the respective one of the side arms 111.

Figure 9:
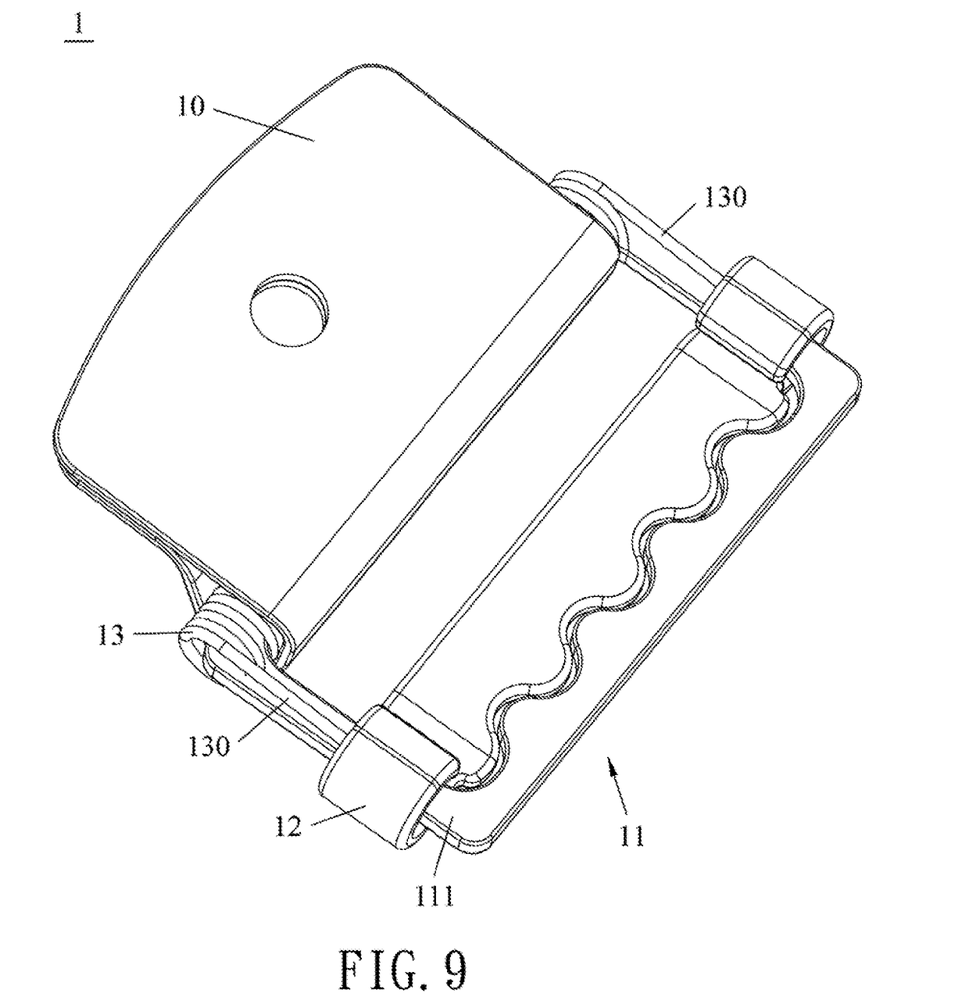
FIG. 9 is a perspective view illustrating a fifth exemplary embodiment of the buckle device according to the present disclosure.
Figure 10:
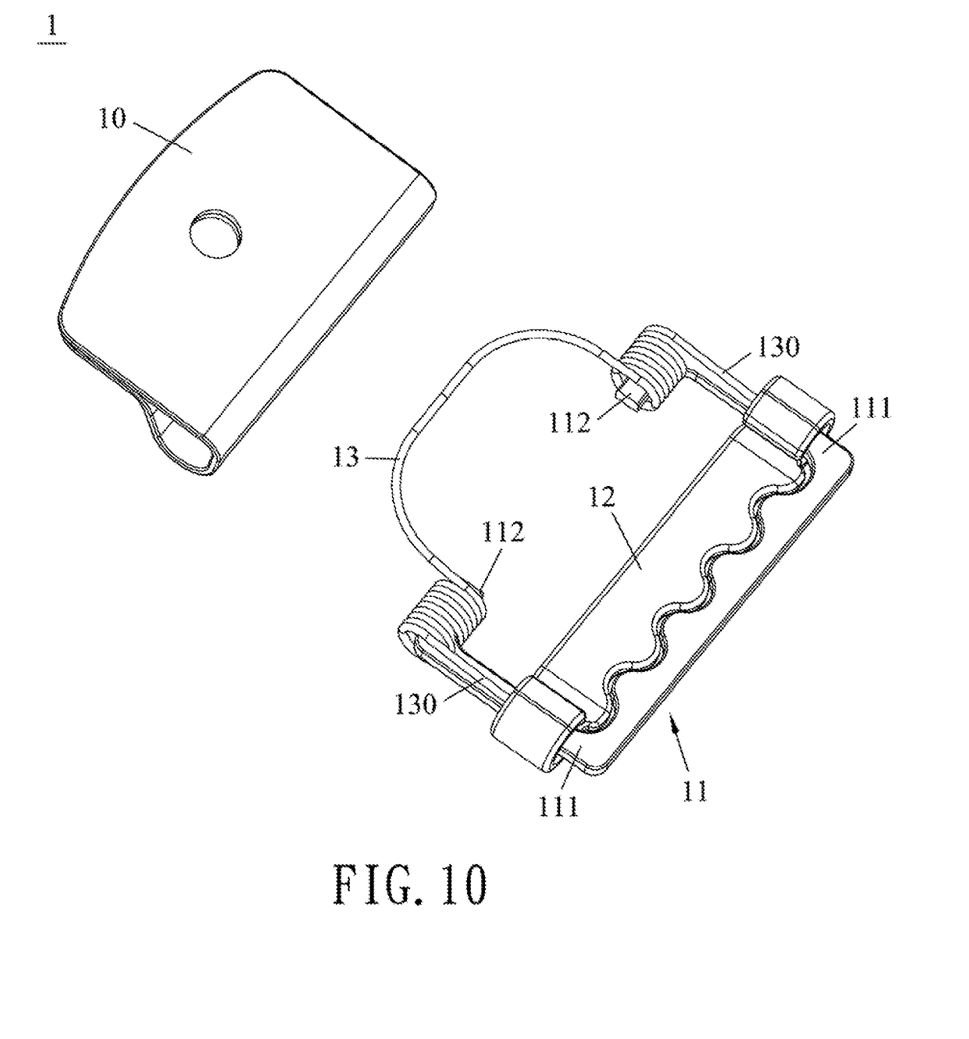
FIG. 10 is a partly exploded perspective view of the fifth exemplary embodiment.

Referring to FIGS. 9 and 10, the fifth exemplary embodiment of the buckle device 1 according to the present disclosure is shown to be similar to the third exemplary embodiment, with the difference therebetween residing as follows. In this embodiment, the pivoting portion 112 of the frame 11 is configured to have a pair of spaced-apart pivoting arms to which the side arms 111 are respectively connected, and the abutting end portion of the resilient member 13 includes two abutting parts 130 each being partly wound on a respective one of the pivoting arms and partly extending along a respective one of the side arms 111.

To sum up, the buckle device 1 of the present disclosure utilizes the abutting end portion of the resilient member(s) 13 to abut against the side arms 111 of the frame 11, so as to bias the frame 11 and the slide member 12 to rotate toward the base. As such, the frame 11 and the slide member 12 are enabled to press the belt (Z) against the base and provide relatively stable fastening or retaining of the belt (Z) in comparison to the aforementioned prior art. In other words, the belt (z) will not be released from the buckle device of the present disclosure unless the frame 11 is rotated manually to overcome the resilient force provided by the resilient member 13.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A buckle device, comprising:
   a securing member adapted to be fixedly mounted on a base;
   a frame including:
      a pivoting portion that is pivotally connected to said securing member to enable said frame to rotate relative to said securing member,
      a pair of side arms that are respectively connected to two opposite ends of said pivoting portion, and
      a forearm that is disposed oppositely to said pivoting portion and has opposite ends respectively connected to said side arms; and
   at least one resilient member having a secured end portion that is secured at said securing member, and an abutting end portion that is in abutment with said frame for biasing said frame to rotate toward said base;
   wherein said abutting end portion has two abutting parts respectively abutting against said side arms.

2. The buckle device according to claim 1, wherein said pivoting portion is arranged parallel to said forearm, said pivoting portion, said side arms, and said forearm being co-planar.

3. The buckle device according to claim 2, wherein said securing member is configured as a plate shape at one end thereof and is formed with a sleeve at another end thereof, and said pivoting portion of said frame is rotatably received in said sleeve so that said forearm is rotatable away or toward said base.

4. The buckle device according to claim 1, further comprising a slide member having two opposite ends slidably and respectively connected to said side arms between said pivoting portion and said forearm.

5. The buckle device according to claim 4, further comprising a belt that is extended through a space between and is clamped by said slide member and said forearm.

6. The buckle device according to claim 4, wherein said forearm and said slide member respectively have toothed edges that are opposite to each other and that have a matching configuration.

7. The buckle device according to claim 1, wherein said resilient member is a metal wire connected to said securing member and said frame.

8. The buckle device according to claim 1, wherein said resilient member is formed as a closed loop structure.

9. The buckle device according to claim 1, wherein said secured end portion is configured as a winding coil fixed to said securing member.

10. The buckle device according to claim 1, wherein said abutting end portion extends along said side arms of said frame in a bifurcated manner.

11. The buckle device according to claim 1, wherein said securing member is formed from a plate that is bent and folded to form a sleeve to receive said pivoting portion.

12. The buckle device according to claim 1, which is adapted to be installed on a seating device for retaining a fastening belt.

13. The buckle device according to claim 1, wherein said abutting end portion is partly wound around said pivoting portion, said abutting parts extending from said pivoting portion to said side arms to abut against said side arms.

14. The buckle device according to claim 13, wherein said pivoting portion includes a single pivoting arm with two opposite ends respectively connected to said side arms, and said abutting parts respectively extend along said side arms from said two opposite ends of said single pivoting arm.

15. The buckle device according to claim 13, wherein said pivoting portion includes a pair of spaced-apart pivoting arms to which said side arms are respectively connected, each of said abutting parts being partly wound on a respective one of said pivoting arms and partly extending along a respective one of said side arms.

16. The buckle device according to claim 13, wherein said at least one resilient member includes two resilient members respectively disposed at opposite ends of said pivoting portion.

17. A buckle device, comprising:
   a securing member adapted to be fixedly mounted on a base;
   a frame including:
      a pivoting portion that is pivotally connected to said securing member to enable said frame to rotate relative to said securing member,
      a pair of side arms that are respectively connected to two opposite ends of said pivoting portion, and
      a forearm that is disposed oppositely to said pivoting portion and has opposite ends respectively connected to said side arms; and
   at least one resilient member having a secured end portion that is secured at said securing member, and an abutting end portion that is in abutment with said frame for biasing said frame to rotate toward said base;
   wherein said secured end portion of said resilient member is configured as a winding coil, and said abutting end portion includes two abutting parts respectively abutting against said side arms.

18. A buckle device, comprising:
   a securing member adapted to be fixedly mounted on a base;
   a frame including a pivoting portion that is pivotally connected to said securing member to enable said frame to rotate relative to said securing member, a pair of side arms that are respectively connected to two opposite ends of said pivoting portion, and a forearm that has opposite ends respectively connected to said side arms oppositely of said pivoting portion;

- a slide member having two opposite ends slidably and respectively connected to said side arms between said pivoting portion and said forearm;
- a belt extending through a space between said slide member and said forearm and clamped by said slide member and said forearm; and
- at least one resilient member having a secured end portion that is secured at said securing member, and an abutting end portion that is in abutment with said frame for biasing said frame to rotate toward the base and to restraint said belt;
- wherein said abutting end portion has two abutting parts respectively abutting against said side arms.

* * * * *